(12) United States Patent
Wilkes et al.

(10) Patent No.: US 9,483,508 B1
(45) Date of Patent: Nov. 1, 2016

(54) OMEGA NAMES: NAME GENERATION AND DERIVATION

(71) Applicant: GOOGLE INC., Mountain View, CA (US)

(72) Inventors: John Wilkes, Mountain View, CA (US); Todd Pu-Tse Wang, Saratoga, CA (US); Walfredo Cirne, Palo Alto, CA (US); Brian Grant, San Carlos, CA (US); Indranil Gupta, Mountain View, CA (US)

(73) Assignee: Google Inc., Mountain View, CA (US)

( * ) Notice: Subject to any disclaimer, the term of this patent is extended or adjusted under 35 U.S.C. 154(b) by 89 days.

(21) Appl. No.: 13/931,485

(22) Filed: Jun. 28, 2013

(51) Int. Cl.
*G06F 17/30* (2006.01)

(52) U.S. Cl.
CPC .............................. *G06F 17/30312* (2013.01)

(58) Field of Classification Search
CPC ... G06F 17/243; G06F 11/3684; G09B 5/00; G09B 5/06; G09B 7/00
USPC ................................. 709/227, 229, 237, 245
See application file for complete search history.

(56) References Cited

U.S. PATENT DOCUMENTS

| | | | |
|---|---|---|---|
| 5,581,760 A | 12/1996 | Atkinson et al. | |
| 6,675,353 B1 * | 1/2004 | Friedman | G06F 17/227 709/226 |
| 6,760,746 B1 * | 7/2004 | Schneider | 709/203 |
| 2001/0020243 A1 | 9/2001 | Koppolu et al. | |
| 2002/0174330 A1 | 11/2002 | Cabrera et al. | |
| 2004/0148326 A1 | 7/2004 | Nadgir et al. | |
| 2006/0173937 A1 | 8/2006 | Sia et al. | |
| 2007/0061222 A1 | 3/2007 | Allocca et al. | |
| 2011/0004929 A1 * | 1/2011 | Hopkins et al. | 726/9 |
| 2011/0314156 A1 * | 12/2011 | Ozzie | G06F 17/3012 709/226 |

FOREIGN PATENT DOCUMENTS

EP   0578207 A2   1/1994

OTHER PUBLICATIONS

International Search Report for PCT/US2014/044359 dated Mar. 24, 2015.
International Preliminary Report on Patentability and Written Opinion for PCT/US2014/044359 dated Dec. 29, 2015.

* cited by examiner

*Primary Examiner* — Kim T Nguyen
(74) *Attorney, Agent, or Firm* — Lerner, David, Littenberg, Krumholz & Mentlik, LLP

(57) ABSTRACT

A method of verifying the validity of a fully-qualified resource name within an environment including at least two different resource name spaces. The method includes receiving a fully qualified resource name having two or more tokens; and reading a token from the name. If the token represents the start of a name space, adding the name space onto a stack; and reading another token from the name. If read token doesn't represent the start of a name space, determining if it represents an end of the name space. If it does represent the end of the name space, popping the top of the stack as the subsequent token from the name. If it doesn't represent the start or end of the name space, checking if the token is a valid moniker for the name space. If it is valid, reading another token from the name, and otherwise returning an error.

18 Claims, 6 Drawing Sheets

| Human Object Name |
| --- |
| 4110 |

| Schema 1 Object |
| --- |
| 4000 |
| Moniker_1<br>4010 |
| Moniker_2<br>4020 |
| S1_Origin = Human Object Name<br>4030 |

| Schema 1-1 Object |
| --- |
| 4040 |
| Moniker_1<br>4060 |
| Moniker_2<br>4070 |
| S11_Moniker_3<br>4050 |
| S11_Moniker_4<br>4080 |
| S11_Origin = S1_Object<br>4090 |
| S1_Origin = Human Object Name<br>4100 |

Fig. 4

OMEGA NAMES: NAME GENERATION AND DERIVATION

BACKGROUND

Today increasingly, a complex large-scale computing environment is composed of multiple systems. These systems are independently developed and interact with each other, as well as interact with the user(s). Each of these systems in the environment manages a great number of resources, and these resources have names. A name may be used by a human to reference the resource in question; it may also be used by machines as a reference, and to resolve to a unique identifier with which to access and manage that resource.

A challenge in such environments is the complexity explosion in naming, both across the systems, and for the user. The issue arises from the fact that each system, because it may be independently built, is free to use its own naming technique (syntax+semantics) for its own resources. This leads to the following sources of complexity:

a. One system may not be able to correctly or accurately reference or include another system's names inside its own names or naming conventions.

b. Due to system-system interactions, each system should be able to understand and resolve names from other systems. Such name resolution may be addressed either by one of two approaches:
  i. having each system understand each other system's naming technique (which is an $O(N^2)$ effort if there are N systems), or
  ii. creating a monolithic hand-coded naming system for the entire environment: this may need to be done on a case by case basis for each system and is extremely labor-intensive.

c. A user may have to deal with multiple naming techniques, one for each system, and the user must also maintain an awareness of each system and its associated naming technique.

d. The fully-qualified names from each system, which are the completely unique names given to system resources by the system, can be verbose, making them difficult to read or parse and, in some cases, running into limits on name sizes or message sizes.

SUMMARY

In some embodiments of solutions discussed herein, a complex large-scale computing environment is composed of multiple systems. Such an environment may therefore be thought of, in some cases, as a system-of-systems.

In view of the foregoing, it is desired to provide or define a systematic way of:

a. allowing one system to create and use resource names that include within it names of resources from other system(s);

b. allowing individual systems' naming to evolve independent of each other;

c. allowing systems to be added and removed from the environment;

d. allowing a user to see only parts of a given resource name that are relevant to her current context, and allowing machines to automatically translate between this partial-name and the fully-qualified name;

e. allowing names to carry with them extra information about the resource, useful as hints for machines and humans to use the name;

f. supporting combinations of the above features; and g. allowing generalization of such resource naming and name resolution schemes to broad collections of environment.

It is necessary, for any group of system resources or any environment resource pool, to uniquely identify the resource objects therein, so that resource objects can contain unambiguous references to one another, and fetch information about an object given a related object (i.e., objects need to retrievable by their unique identifier). Although there are some known mechanisms for generating unique identifiers, these mechanisms are purely machine-oriented, producing long strings of hexadecimal digits that are not legible or comprehensible to a human user. Although such machine-generated names (which may be fully-qualified names) may be masked or translated for presentation in external interfaces aimed at end users (e.g., by providing "simple names", or hiding the object's identity inside a graphical user interface such as a sketching system), such a naming scheme still causes difficulty for users working inside the system, such as system developers and/or operators that need to visually or manually parse the names. In part this may be due to the fact that fully-qualified names may include information such as a logical or physical location of the resource in the system and may be based on or include information about a relationship between the named resource and other system resources. Debugging and/or logging tools also suffer from the problem of legibility and usability because they include names which are not readily legible or comprehensible to human users.

Within the context of this document, the term "resource" means any physical or logical component or data item or data collection that can be specifically identified for purposes of access, processing, tracking, or other uses within a system. A "resource" may, for example, include running processes, task requests, physical storage locations, virtual machines, processors, databases, database entries, and other system objects and/or components.

Embodiments of techniques and solutions and systems described herein may be applicable in a computing resource environment including at least two different resource name spaces. In embodiments of such an environment, solutions, techniques, and systems described herein may include a method of generating a fully qualified resource name for a particular resource based on a context-based name of that resource and a particular usage context, the method comprising: receiving, as inputs, a name schema associated with the resource name, the context-based name, and the usage context; comparing an entry in the name schema and an entry in the context-based name; determining, based on an outcome of said comparing, whether the schema includes a moniker that is missing from the context-based name; in response to a determination that the schema includes a moniker that is missing from the context-based name, determining whether the missing moniker is an attribute space moniker; in response to a determination that the missing moniker is an attribute space moniker, adding the attribute space moniker to a full name that includes the context-based name; in response to a determination that the missing moniker is not an attribute space moniker, determining the attribute space associated with the missing moniker; searching the usage context for information representing an association between the missing moniker, the attribute space associated with the missing moniker, and a value assigned to the missing moniker; and appending the searched-for attribute space, missing moniker, and value assigned to the missing moniker to the full name.

In some embodiments, a first entry in the schema is an attribute space moniker. In some embodiments, the context includes information about an origin attribute. In some embodiments, the origin attribute is included in the returned full name.

In some embodiments, the method further includes a step of, in response to the determination that the missing moniker is an attribute space moniker, pushing data representing the missing moniker onto a top an attribute space stack. In some embodiments, determining the attribute space associated with the missing moniker includes selecting a moniker at the top of the attribute space stack as the attribute space associated with the missing moniker.

In some embodiments, the step of comparing an entry includes comparing a first entry in the name schema and a first entry in the context-based name. In some embodiments, the step of adding the attribute space moniker includes comparing a subsequent entry in the name schema and a subsequent entry in the context-based name. In some embodiments, the step of appending the searched-for attribute space includes comparing a subsequent entry in the name schema and a subsequent entry in the context-based name.

In some embodiments, the method further includes steps of determining whether all entries in the schema have been evaluated; and in response to a determination that all entries in the schema have been evaluated, returning the full name as the fully qualified resource name, where the fully qualified resource name is unique across all resource name spaces.

In some embodiments, the method further includes steps of determining whether the subsequent entry in the name schema indicates an end of an attribute space definition; and in response to a determination that the subsequent entry in the name schema indicates an end of an attribute space definition, popping the moniker at the top of the attribute space stack off of the attribute space stack.

In some embodiments, the particular usage context includes metadata indicating a preferred name resolver for the full name. In some embodiments, the context-based name is a name associated with a particular task and the context includes metadata representing a current machine on which a task with the context-name is scheduled. In some embodiments, the context-based name is a human-readable name that, in combination with the particular usage context, uniquely identifies the particular resource within the computing resource environment. In some embodiments, the particular usage context includes a metadata representing a time-stamp associated with the resource.

In some embodiments, the fully qualified resource name is a human-readable name that uniquely identifies the particular resource within the computing resource environment. In some embodiments, the fully qualified resource name and the context-based name are both human-readable names. In some embodiments, the fully qualified resource name includes a plurality of first monikers associated with a first attribute space and a second moniker associated with a second attribute space. In some embodiments, a value associated with one of said plurality of first monikers includes the second moniker.

Embodiments of solutions, techniques, and systems described herein may include a method of verifying the validity of a fully qualified resource name within an environment including at least two different resource name spaces, the method comprising: receiving, as an input, a fully qualified resource name, the fully qualified resource name including a plurality of tokens; reading a token from the fully qualified resource name; determining whether the read token represents a start of a resource name space; in response to a determination that the read token represents the start of a resource name space, adding information representing the resource name space onto a stack; and reading a subsequent token from the fully qualified resource name; in response to a determination that the read token does not represent the start of a resource name space, determining whether the read token represents an end of the resource name space; in response to a determination that the read token represents the end of the resource name space, reading an item information from a top of the stack as the subsequent token from the fully qualified resource name; in response to determination that the read token does not represent the start of the resource name space and that the read token does not represent the end of the resource name space, determining whether the read token represents a valid moniker for the resource name space; in response to a determination that the read token does not represent a valid moniker for the resource name space, returning an error; and in response to a determination that the read token does represent a valid moniker for the resource name space, reading a subsequent token from the fully qualified resource name.

In some embodiments, the fully qualified resource name includes information about a first resource name space and a second resource name space. In some embodiments, information about the second resource name space is nested within the information about the first resource name space such that the subsequent token may represent a start of the second resource name space. In some embodiments, the first resource name space and the second resource name space have independent naming conventions.

In some embodiments, the step of returning an error including terminating a name validation process. In some embodiments, the method further includes steps of determining whether all tokens in the resource name have been read; and in response to a determination that all tokens in the resource name have been read, returning an indication that the fully qualified resource name is valid.

In some embodiments, the step of determining whether the read token represents a valid moniker for the resource name space includes reading a value associated with the read token and determining whether the read value is a valid value for the moniker represented by the read token.

In some embodiments, the second resource name space is represented as part of a value associated with a moniker of the fully qualified resource name defined within the first resource name space.

Embodiments of solutions, techniques, and systems described herein may include a data structure representing an object in an attribute name space for naming resources, the data structure comprising: an attribute name space identifier that uniquely identifies the attribute name space with respect to other attribute name spaces; at least one local moniker representing a local resource attribute, said local moniker having an associated value representing a value of the local resource attribute; and at least one inherited moniker, the inherited moniker being a local moniker of a parent name space where a parent name space may have multiple child name spaces and where each child name space receives all the local monikers of a parent name space as inherited monikers.

In some embodiments, the data structure may include at least one overloaded moniker, the overloaded moniker representing a local resource attribute defined in the attribute name space. In some embodiments, the overloaded moniker may have a name identical to a local moniker of the parent name space. In some embodiments, the overloaded moniker may replace the inherited moniker from the parent name space in the attribute name space.

In some embodiments, the data structure may include a moniker representing an origin attribute, a value of the origin attribute representing at least one of a human-provided name for the object and a reference to an origin attribute of a second object in a second attribute name space, the second attribute name space being different from the attribute name space.

In some embodiments, the data structure may include a second inherited moniker, the second inherited moniker being a local moniker of a second parent name space such that the attribute name space of the object has at least two parent name spaces.

In some embodiments, the origin attribute is inherited from the parent name space. In some embodiments, the origin attribute is an overloaded moniker.

Embodiments of solutions, techniques, and systems described herein may include a method of deriving a fully-qualified name of a destination resource in a particular system within an environment based on a set of derivation rules associated with the particular system, the method comprising: receiving, as inputs, a name of a source resource of the destination resource, an attribute value associated with the destination resource and a name schema associated with the source resource; generating a destination resource name based on the name of the source resource; and transforming the generated name into a derived destination resource name by performing two or more operations from among the following: changing a value of an attribute within the generated destination resource name based on the derivation rules; adding an attribute to the generated destination resource name and generating an attribute value for the added attribute based on the derivation rules; deleting an attribute and an associated attribute value from the generated destination resource name based on the derivation rules; nesting an attribute name within an attribute value of the generated destination resource name based on the derivation rules; and extracting a nested attribute name from an attribute value of the generated destination resource name based on the derivation rules.

In some embodiments, nesting includes deleting a first attribute and associated first attribute value from the generated destination resource name; and adding the deleted first attribute and associated first attribute value as a second attribute value associated with a second attribute in the generated destination resource name.

In some embodiments, extracting includes deleting a first attribute value associated with a first attribute in the generated destination resource name; and adding the deleted first attribute as a second attribute and an associated second attribute value to the generated destination resource name.

In some embodiments, changing includes changing a value of a schema attribute in the generated destination name such that the generated destination name becomes associated with a schema different from that of the source resource.

In some embodiments, the derivation rules are included in the name schema associated with the source resource. In some embodiments, the derivation rules are generated from the name schema associated with the source resource.

In some embodiments, the source resource is associated with a system different from the particular system. In some embodiments, the source resource is associated with a first resource type and the destination resource is associated with a second resource type different from the first resource type.

In some embodiments, the second resource type inherits at least one attribute from the first resource type.

In some embodiments, the particular system is associated with a first name space and where the source resource is associated with a second name space different from the first name space. In some embodiments, the second name space inherits at least one attribute from the first name space.

Embodiments of solutions, techniques, and systems described herein may include a system comprising: a processor disposed in a computing resource environment including at least two different resource name spaces; and a processor-readable memory having embodied thereon instructions configured to cause the processor to execute a method of generating a fully qualified resource name for a particular resource based on a context-based name of that resource and a particular usage context, the method comprising: receiving, as inputs, a name schema associated with the resource name, the context-based name, and the usage context; comparing an entry in the name schema and an entry in the context-based name; determining, based on an outcome of said comparing, whether the schema includes a moniker that is missing from the context-based name; in response to a determination that the schema includes a moniker that is missing from the context-based name, determining whether the missing moniker is an attribute space moniker; in response to a determination that the missing moniker is an attribute space moniker, adding the attribute space moniker to a full name that includes the context-based name; in response to a determination that the missing moniker is not an attribute space moniker, determining the attribute space associated with the missing moniker; searching the usage context for information representing an association between the missing moniker, the attribute space associated with the missing moniker, and a value assigned to the missing moniker; and appending the searched-for attribute space, missing moniker, and value assigned to the missing moniker to the full name.

Embodiments of solutions, techniques, and systems described herein may include a system comprising: a processor disposed in a computing resource environment including at least two different resource name spaces; and a processor-readable memory having embodied thereon instructions configured to cause the processor to execute a method of verifying the validity of a fully qualified resource name within the environment, the method comprising: receiving, as an input, a fully qualified resource name, the fully qualified resource name including a plurality of tokens; reading a token from the fully qualified resource name; determining whether the read token represents a start of a resource name space; in response to a determination that the read token represents the start of a resource name space, adding information representing the resource name space onto a stack; and reading a subsequent token from the fully qualified resource name; in response to a determination that the read token does not represent the start of a resource name space, determining whether the read token represents an end of the resource name space; in response to a determination that the read token represents the end of the resource name space, reading an item information from a top of the stack as the subsequent token from the fully qualified resource name; in response to determination that the read token does not represent the start of the resource name space and that the read token does not represent the end of the resource name space, determining whether the read token represents a valid moniker for the resource name space; in response to a determination that the read token does not represent a valid moniker for the resource name space, returning an error; and in response to a determination that the read token does represent a valid moniker for the resource name space, reading a subsequent token from the fully qualified resource name.

Embodiments of solutions, techniques, and systems described herein may include a non-transitory computer-readable medium having embodied thereon a data structure representing an object in an attribute name space for naming resources, the data structure comprising: an attribute name space identifier that uniquely identifies the attribute name space with respect to other attribute name spaces; at least one local moniker representing a local resource attribute, said local moniker having an associated value representing a value of the local resource attribute; and at least one inherited moniker, the inherited moniker being a local moniker of a parent name space where a parent name space may have multiple child name spaces and where each child name space receives all the local monikers of a parent name space as inherited monikers.

Embodiments of solutions, techniques, and systems described herein may include a system comprising: a processor disposed in a computing resource environment including at least a first system; and a processor-readable memory having embodied thereon instructions configured to cause the processor to execute a method of deriving a fully-qualified name of a destination resource in the first system within an environment based on a set of derivation rules associated with the first system, the method comprising: receiving, as inputs, a name of a source resource of the destination resource, an attribute value associated with the destination resource and a name schema associated with the source resource; generating a destination resource name based on the name of the source resource; and transforming the generated name into a derived destination resource name by performing two or more operations from among the following: changing a value of an attribute within the generated destination resource name based on the derivation rules; adding an attribute to the generated destination resource name and generating an attribute value for the added attribute based on the derivation rules; deleting an attribute and an associated attribute value from the generated destination resource name based on the derivation rules; nesting an attribute name within an attribute value of the generated destination resource name based on the derivation rules; and extracting a nested attribute name from an attribute value of the generated destination resource name based on the derivation rules.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 4, shows an embodiment of name schemas with an untyped attribute as described herein.

Figure 1:
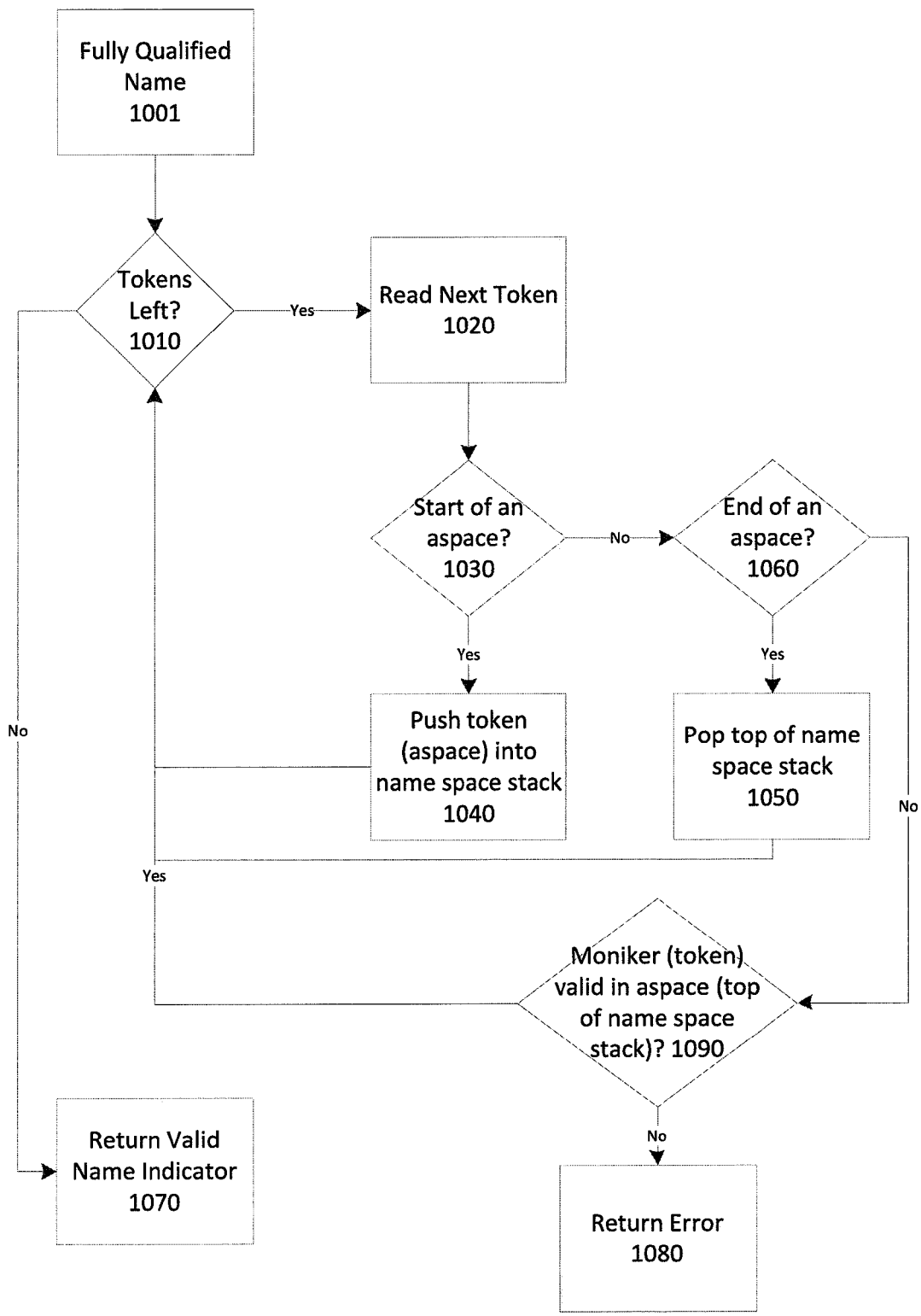
FIG. 1 shows a block diagram of an embodiment of a name validation process as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

In view of the foregoing, this disclosure describes a way to identify objects that is readable to humans, while also allowing machines to automatically create and use these object identifiers at run-time. Such a method, and/or a system or environment implementing or using such a method will include the following features:

a. names that serve as unique resource and/or object identifiers across space and time within the system and/or environment;

b. human-oriented names that are space-unique, and bind dynamically to the space- and time-unique names inside the system;

c. names to capture arbitrary relationships of named resources with other objects;

d. a way to structure a name in a manner that makes it easy for people to name things according to the way that they think about object relations (e.g., if a group of objects are associated with a service, the object names should reflect this);

e. a way for machines and run-time software to derive names of related objects from each other, thus saving both the memory overhead of maintaining object pointers as well as the memory, network and computational overhead of fetching the objects themselves in order to extract these related objects;

f. platform independence;

g. code for such name derivations to be automatically generated;

h. human-specified names to be carried through the system as-is (and made visible to the humans again, e.g., in the UI).

This disclosure includes the following ideas:
a. aspaces (attribute spaces) which are like namespaces for attributes; e.g., each system may have its own aspace;
b. context-sensitive names: creating partial easy-to-read names from longer names by using a context, and the reverse operation of creating the full name from the partial name—including rules describing what to add when;
c. methods for associating metadata with names—including hints about resolution, context-sensitivity, and other ways of using the name;
d. combinations of the above techniques.

An objective of this disclosure is to allow for the creation of names that are both human-readable and also uniquely identify system resources. Such names are suitable for use by both machines and humans while minimizing an amount of potential confusion and secondary processing required to otherwise "translate" a name between machine-readable and human-readable formats.

Aspaces

An attribute space (aspace) is a family of attribute names. In some embodiments, attribute names may be known or referred to as monikers. In some embodiments, each system may have its own aspace. Each aspace may have a globally unique name called the aspace moniker. A pairing of the aspace moniker and the attribute moniker enables the unique, environment-wide definition, across all systems involved, of any given attribute from any one naming system. E.g., an attribute moniker <foo>, when paired with an aspace moniker A, has one and only one meaning. This means a different aspace B is allowed to define an attribute <foo> which is not the same as A's<foo> attribute. For instance, moniker <last_name> means family name in _aspace= US but in patronymic cultures (like _aspace= Iceland), <last_name> has a different meaning. Each system in the environment is assigned a unique name called the system moniker (this could be a string). The aspace corresponding to a system, whose system moniker is S, has its aspace moniker equal to, or derived from, S.

Using Aspaces Inside Names

To qualify a given attribute moniker within a resource or object name, the aspace moniker may be written separately as the value of a special <aspace> attribute, and the attribute moniker afterwards. E.g., [_aspace=USA last_name=Smith]. In some embodiments, the reading/parsing rules (discussed later) may also show how a sequence of attributes can be associated with a single aspace term. Such association of attributes with an aspace term may provide a method for one system to use, inside its own names, attributes from another system. This is possible because such external attributes are qualified by using the other system's aspace moniker. An example of such a name having nested names may be written as [_aspace=Space1 space1attribute1=green space2attribute2=[_aspace=Space2 space2attribute1=round]]

In some embodiments, nested names may be allowed to be either typed (where the global schema of the nested name is known) or untyped. This untyped aspect will be discussed later in this document with respect to name derivation from origin attributes.

In some embodiments, a system's naming may evolve independently of other systems because there are no attribute moniker conflicts. For example, in an embodiment where an environment contains two systems S1 and S2, where a resource R1 in S1 is an instantiation of a resource R2 that is in S2. Then, R1's name may be written by nesting R2's name inside it: [_aspace=S1 . . . name for R1 in S1's naming convention . . . source=[_aspace=S2 . . . name for R2 in S2's naming convention . . . ].

Some embodiments may also specify how to read or parse such names to verify the validity of the attributes within. Some embodiments of a naming or name parsing method may allow a sequence of attribute monikers to be paired with one aspace term (rather than requiring a separate aspace term for each attribute, thus making names shorter). One embodiment of such a method, as shown in FIG. 1, is as follows:

Input: Fully-qualified Name N
Output: Boolean; whether N's attributes are valid in their aspaces
Internal Data: Aspace stack whose elements are aspace monikers
While (there are tokens left in name N) {
a. Read next token from N (left to right order)
b. if encounter "[", then
  i. this is followed by an [_aspace=a] term;
  ii. push a onto aspace stack; continue;
c. if encounter "]"
  i. pop the stack; continue
d. if encounter an attribute and its moniker is not declared/valid within the aspace whose aspace moniker is the top of the aspace stack
  i. return error
}

As can be seen from the flowchart in FIG. 1, a fully-qualified name 1001 of a resource may be received by a system or system component or process being executed in a data center or data processing environment configured or otherwise intended to perform a resource name validation operation. The fully-qualified name 1001 of the resource may include information about the system where the resource resides and also information about the aspaces that include all the attributes associated with the resource. Such a fully qualified name 1001 may be seen as a series of tokens. Such tokens may be individual characters, words, special characters, bit strings of varying length, hexadecimal numbers, or combinations thereof. An example of a fully-qualified name for a data storage device associated with a virtual machine assigned to a cluster C1 in a data center D1 may be [_aspace=StorageDevice device=sda machine= [_aspace=VirtualMachine vm=V1 location=[_aspace= Cluster cluster=C1 datacenter=D1]]].

In validating such a fully-qualified name, a token traversal process may be employed. In such a process, each token of the fully qualified name is read and examined to determine whether it defines an attribute, attribute value, or a start or end of an attribute space or name space (aspace). This may be realized by sequentially reading the next token 1020 in the name (so long as there are unread tokens remaining 1010 in the name) and evaluating the read token to determine whether it defines the start of an attribute space (aspace) or name space 1030. Such a definition may be determined by a special character or word of combination thereof. For example, the location of the VM V1 in the previous example is [_aspace=Cluster cluster=C1 datacenter=D1], which is written using the namespace Cluster, which defines attributes cluster and datacenter. Another deployment of the system could use [_aspace=Colo provider=Foo region=Europe] for a different way to identify location without requiring any change to the system that identifies virtual machines (or storage devices, for that matter).

If the read token defines the start of an aspace or name space 1030, the next term in the name, which may be a subsequent token defining a name or other indicative value of the aspace or name space, is pushed onto an aspace or name space stack 1040. Such a stack may be a data structure that is used to hold values of name spaces such that a fully-qualified name having multiple nested name spaces may be evaluated by traversing each nested name space in depth order.

If the read token instead defines the end of an aspace or name space 1060, the term at the top of the stack is popped and read as though it is the next token in the name 1050. Because of the organization of the stack, the term at the top should always be the name or other indicative value of the aspace indicated as having ended. If the read token does not define the start or end of an aspace or name space, it is evaluated to determine whether the token represents a valid moniker or attribute value 1090. Such an evaluation may be performed with respect to the aspace or name space currently being traversed. In some embodiments, the system or subsystem or process performing name validation may have access to or information about a schema associated with the aspace. In some such embodiments, the read token may be evaluated to determine whether it defines a valid moniker 1090 within the schema of the aspace currently at the top of the stack. If there is no aspace in the stack, validation may be performed with respect to one or both of an aspace local to the system or subsystem or process performing name validation or one or more globally-defined aspaces that define sets or subsets of attributes for all objects across multiple systems.

If the read token is determined to be an invalid moniker, an error message may be returned 1080. In some cases, name validation may proceed despite returning an error message 1080, allowing for multiple possible error messages during a validation. In other embodiments, accumulated error messages may be returned at the end of a validation process. In yet other embodiments, any one error may halt the validation process entirely. If all the monikers in a name are determined to be valid, an indicator may be returned signaling that the name is valid 1070.

In some embodiments, processing and parsing may be simplified if the _aspace attribute is required to be first, but a slightly more complex technique can be used even if it is not, as long as the syntax of names can be parsed. An example of a slightly more complex technique may include parsing in two phase, where the first phase identifies the _aspace attribute and the second phase is as described in FIG. 1.

Aspace Organization

In some embodiments, aspaces be organized with respect to each other using different models. One embodiment may employ a comb model. A comb model is when there is a one-to-one correspondence between aspaces and systems in the environment. In such an embodiment, each aspace is bound to a single system.

Figure 2A:
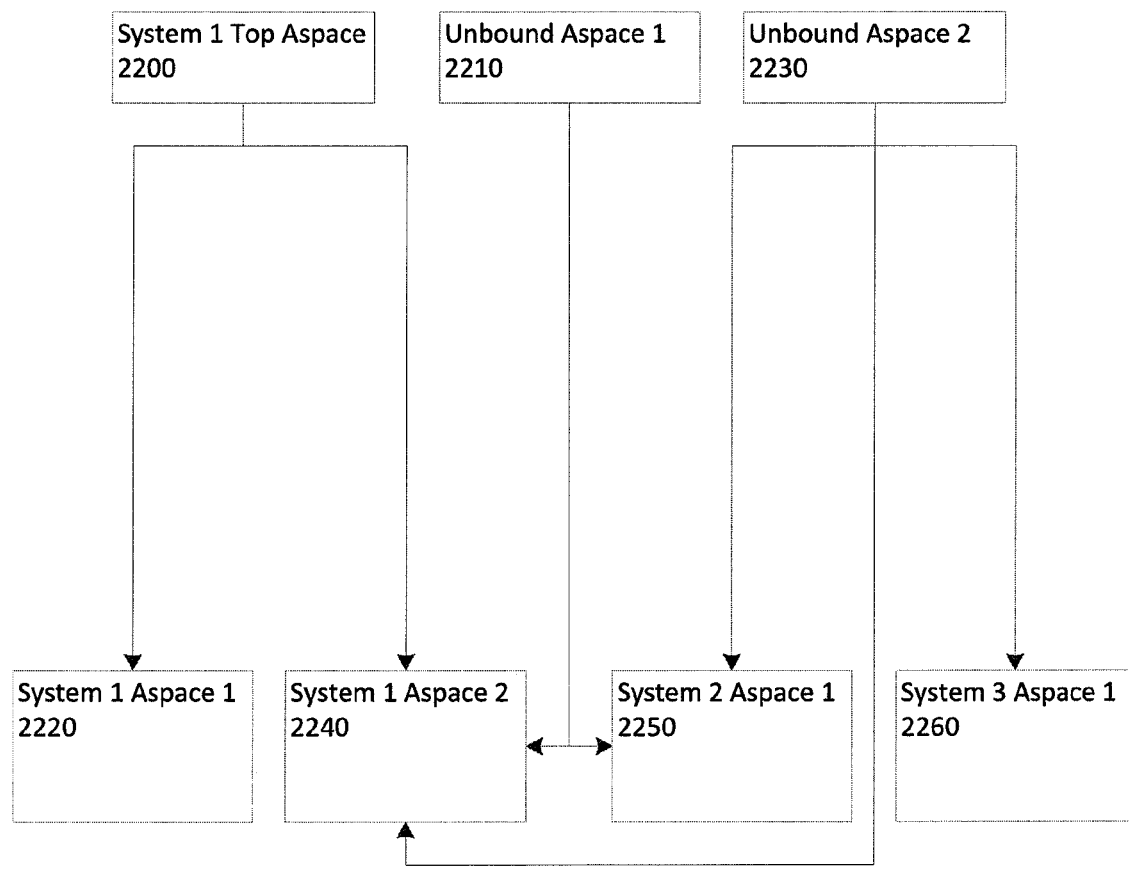
FIG. 2*a* shows a forest model of attribute spaces including unbound attribute spaces as described herein.

In another embodiment, a forest model may be used. In some embodiments, a forest model may be seen as an expansion of the comb model. A forest model may be useful when it is desirable that certain attributes be shared across systems. This approach defines a global forest (collection of trees), where each aspace from the environment appears as one node in the forest. Additionally, in some embodiments, some aspaces in this forest may be unbound (not bound to one system)—this allows attribute sharing across aspaces in the following manner. If aspace A has a child aspace A_child, then a moniker M in aspace A is inherited by A_child with the same meaning and constraints, unless A_child redeclares a new moniker M to override A's M. Yet another embodiment can use a graph model, which is a generalization of the forest model where an aspace can have multiple parents as well as multiple children. An example of a graph model is shown in FIG. 2a.

In the embodiment shown, System 1 may have a top-level aspace 2200 and two lower level aspaces 2220, 2240. The two lower-level aspaces 2220, 2240 may be children of the top-level aspace 2200. Some embodiments of a graph model may also include one or more unbound aspaces 2210, 2230 which are not bound to any particular system. In the embodiment shown, Unbound Aspace 1 2210 and Unbound Aspace 2 2230 may each provide attributes to System 1 Aspace 2 2240 such that System Aspace 2 2240, despite being a child aspace of System 1 Top Aspace 2200, receives attribute information from its parent aspace 2200 and the two unbound aspaces 2210, 2230. By contrast, System 1 Aspace 1 2200 only receives attributes from its parent 2200.

System 2 Aspace 1 2250 is the only aspace defined for System 2 in the embodiment shown. This aspace receives attributes from both unbound aspaces 2210, 2230. System 3 Aspace 1 2260 only receives attributes from Unbound Aspace 2 2230. In another embodiment, System 2 Aspace 1 2250 and System 3 Aspace 1 2260 may be regarded as children of Unbound Aspace 2 2230 because they both receive a common set of attributes from this unbound aspace.

In some such embodiments, if multiple systems use "similar" naming techniques, i.e., they use common attributes, it would be possible for their naming techniques to share attributes explicitly by creating a tree of unbound aspaces that are parents/ancestors of the bound aspaces. For example, for two systems S1 and S2 to share attributes, it is possible to 1) create an unbound aspace U12, 2) set S1's and S2's aspaces as the children of U12, 3) add common attributes from S1 and S2 to U, and 4) remove these shared attributes from S1's and S2's aspaces. For instance if system S1 uses the US human naming system while S2 uses the Iceland human naming system, their unbound parent aspace would contain the <first_name> attribute (common to both S1 and S2) while each of S1 and S2 would define <last_name> separately.

Figure 2B:
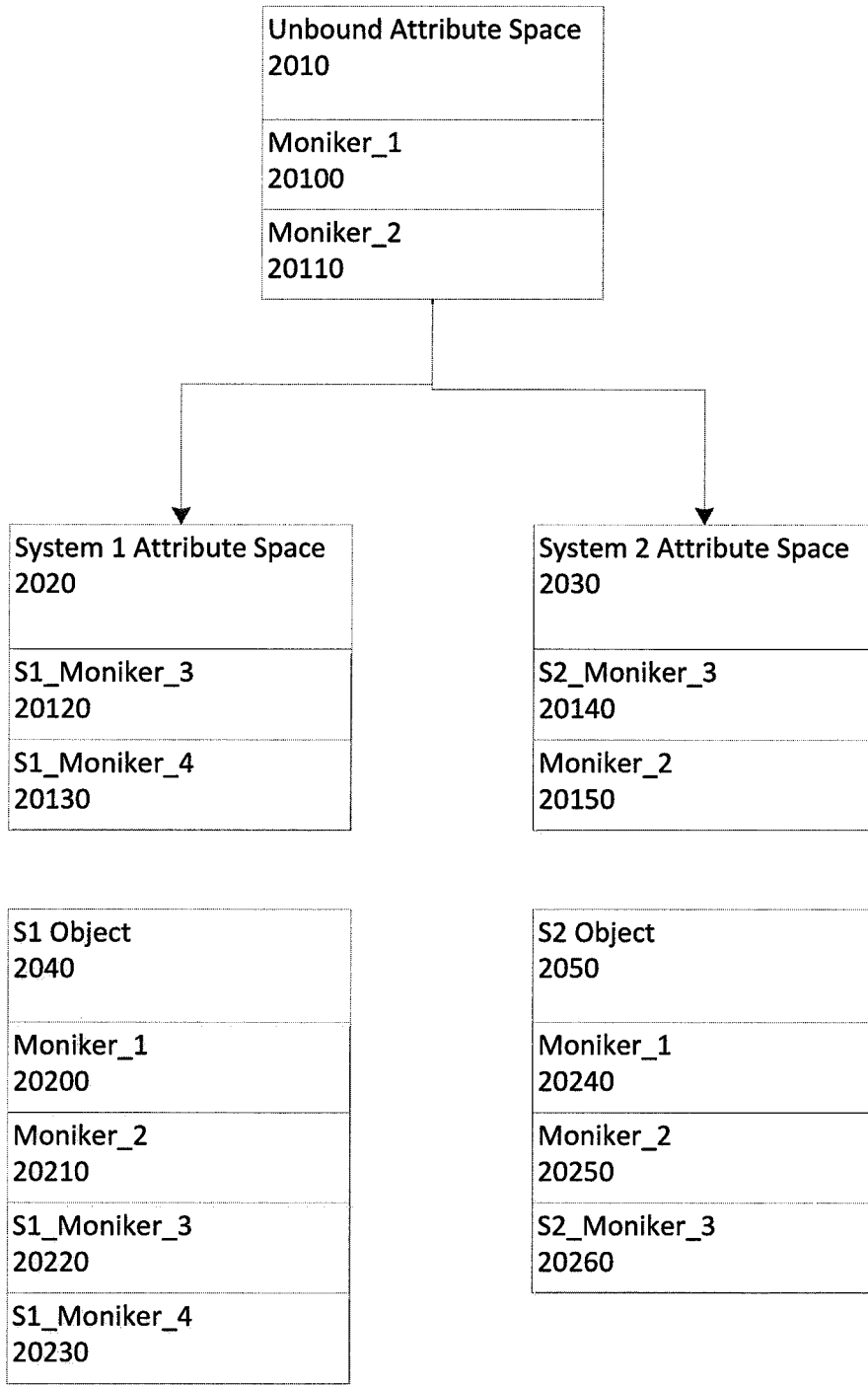
FIG. 2*b* shows an embodiment of attribute space inheritance and overloading as described herein.

An embodiment of such a name space organization scheme is shown in FIG. 2b. In the embodiment shown, an unbound attribute space (aspace) 2010 has defined within it Moniker_1 20100 and Moniker_2 20110. Two system-specific attribute spaces, System 1 2020 and System 2 2030 are child aspaces of the unbound aspace 2010. The system 1 attribute space 2020 defines within itself S1 Moniker_3 20120 and S1 Moniker_4 20130. An object in the System 1 attribute space 2040 would therefore be defined as having instances of Moniker_1 20200 and Moniker_2 20120 inherited from the unbound attribute space 2010 and also Moniker_3 20220 and Moniker_4 20230 from the System 1 attribute space 2020.

One embodiment of the graph model may be where a system itself maps to multiple aspaces. This can be useful for large systems (e.g., consisting of large distributed groups of developers), helping to decouple the evolution of schemas and names in the sub-systems. Over time, as the system evolves, these aspaces can be merged or split further. The graph model also allows naming systems to evolve independently. For instance, in such an embodiment, to introduce a new system S* that largely shares its naming with an existing system S, it may be possible to S*'s aspace be a child of S's aspace—S*'s aspace can then override attributes which are not shared.

Such an embodiment is shown in the System 2 attribute space 2030 definition. In the System 2 attribute space 2030, S2 Moniker_3 20140 is defined. Also, Moniker_2 20150 is redefined within the System 2 attribute space 2030 and this definition overrides the Moniker_2 20110 definition from the unbound attribute space 2010 that is the parent of the System 2 attribute space. An object in the System 2 attribute space 2050 would therefore be defined as having instances of Moniker_1 20240 inherited from the unbound attribute space 2010 and S3 Moniker_3 20260 and Moniker_2 20250 from the System 2 attribute space 2030.

Embodiments of such name space organization may be realized by creating or otherwise establishing rules or data structures or combinations thereof within one or more systems or across multiple systems. Such rules and/or data structures may include databases or database constraints, such as, for example, relational constraints. Other embodiments may realize such name space organization by defining a domain-specific language to declare aspace parent relationships, or even by encoding such relationships in an ad-hoc manner in a general-purpose language (as C++, Java, or Ruby).

Similarly systems (and thus aspaces) can be removed by merely removing their aspace node(s) from the forest/comb. If the aspace monikers were inherited by any other (child/descendant) aspaces, the definitions for those monikers are replicated "down" the tree so that they still exist after the aspace node removal. In some embodiments, the forest to be generalized to a collection of DAGs (directed acyclic graphs). In such embodiments, an aspace may have multiple parents. Such embodiments may be realized in a manner similar to how multiple inheritance is realized in object-oriented programming languages.

Context-Sensitive Naming

This document also discloses techniques by which humans can be allowed to read and deal with short names (e.g. at the UI or command line), while machines can use longer fully-qualified (also known as full) names. Embodiments of these techniques are based on the concept of context-sensitive names. A context-sensitive name is a partial and/or short version of the full name. Intuitively, a full name=context sensitive name "+" information from context. In some embodiments, a context may be associated with a user session, usage environment, or an application or interface. (e.g., a series of UI pages, a command prompt, a Unix directory, a perforce/SVS client, etc.)

In some embodiments, a context may be defined as an unordered collection of (aspace-moniker-value) triples. Within some embodiments of a context, each aspace-moniker combination may appear at most once. A full name (or context-free name) may be globally unique and exactly match a given schema. Given a triple (context, full name, schema), an embodiment of a context-sensitive name can be created by dropping from the full name all the aspace-moniker-value triplets that already appear in the context (recall that the aspace moniker in a name is obtained via the aspace stack). For example, the full name of an American person may be [_aspace=US first_name=John last_name=Smith]. Given the context of the Smith family, i.e. the context expressed by the triples (aspace=US, moniker=_aspace, value=US) (aspace=US, moniker=last_name, value=Smith), we can produce the context sensitive name [first_name=John]. This can be automated by an algorithm that removes from the fully qualified names all moniker=value expressions in namespace aspace that match a triple (aspace, moniker, value) defined by the context.

Figure 3:
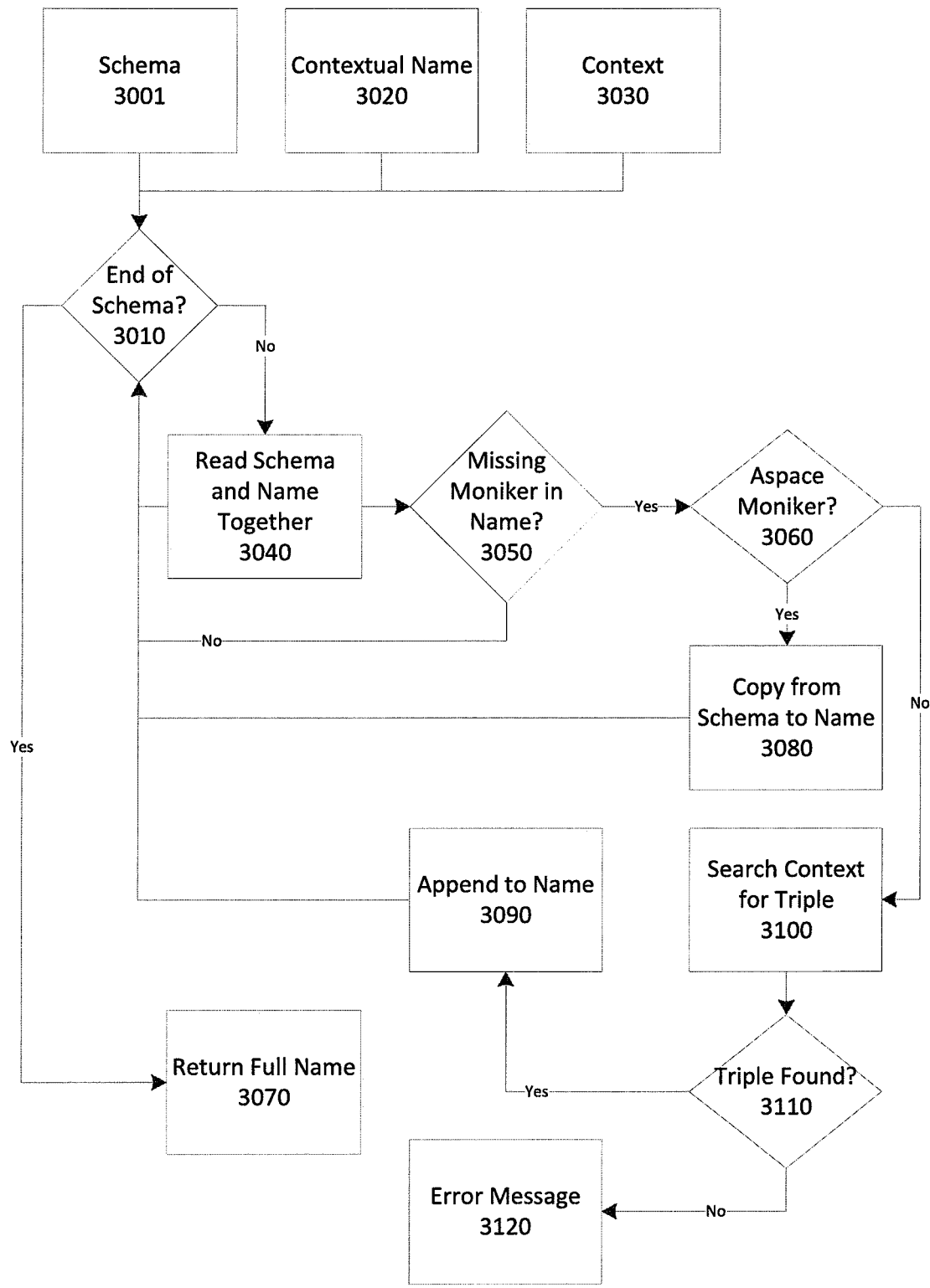
FIG. 3 shows an embodiment of name recovery based on context as described herein.

In some embodiments, it is also possible to reconstruct the full name from the triple (schema, context sensitive name, context). In some embodiments, starting with the context-sensitive name, the context-sensitive name is made to conform to the schema by adding in appropriate attributes from the context. One embodiment of such a full name reconstruction technique, shown in FIG. 3, is as follows:

Input: schema S, context-sensitive name N, and context C:

Output: N as a fully-qualified name while (not at end of S) {
  a. read S and N together left to right while maintaining an aspace stack filled from S (using the algorithm described in the Aspace Section);
  b. find the next missing moniker m=<any value> in S but not in N;
  c. if m is an aspace moniker, copy it from S to N and continue;
  d. let a be the aspace moniker at the top of the aspace stack;
  e. search C for the triple that contains aspace a and moniker m, and append <a=N> to N;
  f. continue;
}

Such context-sensitive name generation and recovery techniques may improve the user's interaction with names in a complex environment. In one embodiment, a cluster management environment may consist of multiple scheduler systems. In such an embodiment, a user foo may send a job named "bar" to scheduler 1. The job may then be stopped and another instance of the same job may be sent to scheduler 2. In an embodiment having context-sensitive name generation and recovery capability, a context sensitive name for both the jobs, as seen by the user on the UI and command line, is merely "bar"—short, readable, and memorable. This context-sensitive name does not include "foo", or information about the schedulers—however, in some embodiments, the full names for each of the jobs may include this information. The context-sensitive name generation and recovery techniques may be used to translate between the full and context-sensitive names either at the user-interface or agent/scheduler side, or both.

Referring to the example above, a schema 3001 associated with one or more schedulers, the contextual name "bar" 3020, and a context 3030 may be provided to a system, subsystem, or process within a data center or data processor meant to perform full name recovery from contextual names. The context 3030 may include information about a job or resource or request associated with the contextual name 3020, including origination and/or destination information.

Reading the schema 3001 and the contextual name 3020 together 3040, a missing moniker, M may be identified 3050 that is found in the schema 3001 but not in the contextual name 3020. If the moniker, M, is an aspace moniker 3060 (e.g. a moniker that defines a name or value indicator of an aspace or name space), the moniker may be copied from the schema to the name 3080 and pushed onto the stack (not shown). If a token indicating an end of an aspace is encountered during the schema reading, the value at the top of the stack may be popped (not shown). Such an operation may occur during reading 3040 of the contextual name and schema.

If the moniker, M, is not an aspace moniker 3060, the aspace moniker, A, at the top of the stack is read and the context 3030 is searched 3100 for a triple that includes the aspace moniker A, the missing moniker M, and a value associated with that missing moniker. If the triple is found 3110, the missing moniker and its associated value are then appended to the name 3090 in association with the aspace moniker A, which may already have been added to the name based on the organization of the schema 3001. If the aspace moniker is not yet part of the name, it may be added at this time as well. If the triple is not found, an error message may be returned or otherwise generated 3120 to indicate that the triple was not found.

When the entire schema has been read 3010 in this way, the contextual name 3020 may have undergone multiple addition and/or append operations to produce a fully qualified name 3070 (also sometimes referred to as a full name), which may then be returned or forwarded to whatever entity or process or system or subsystem requires the full name information in order to fulfill the job or request or otherwise act on the resource indicated in the full name.

Some embodiments of context-sensitive name generation and recovery techniques may be suitable for use in graphical UIs. One embodiment may entail navigation through a series of pages such as: all user jobs→job bar→task #0 of job bar. In one such embodiment, all tasks may have the schema [aspace, task_number, job_name], and all UI pages list all the tasks of the user. On the first page (all userjobs), all task names may be presented with their full names. As the user navigates to the second page (job bar), only job bar's task number's may appear and thus the context-sensitive name is represented as [task_number=_] (aspace and job_name are part of the context now). On the third page (task #0), the context-sensitive name may be empty because the entire name is in the context.

Metadata

Metadata relates to information that a name contains, but that may not be essential to identify the resource being named. In some embodiments, such metadata can be used as hints by both humans and machines. In some such embodiments, metadata may be an unordered set of elements associated with a one or more properties of the name, and thus transitively that of the named resource. Metadata elements can include individual aspace-moniker-value triples or names. Embodiments of a metadata element may be either instance-specific (for the resource being named) or kind-specific (pertains to all resources of a given kind). In some embodiments, each metadata element could be labeled as either "name metadata" or "resource metadata" or both.

In some embodiments, metadata may include information about (but not necessarily restricted to): a resolver (e.g., resolver location, or latencies for different resolvers); a type of address desired from resolver (e.g., AAAA record, MX record); context(s) (for a context-sensitive name)—note that a context-sensitive name may have multiple contexts, each potentially generating a different full name; ACLs (Access Control Lists) for the name (e.g., who can read or resolve this name); and other information (e.g., current machine on which a task with the name is scheduled).

In some embodiments, metadata can be stored in one or more of the following places: attached to the name, in the resolver (e.g., ACLs in a directory), in a context, or in other data stores (e.g., indexed by names or fragments of them). It may be added to the name during resolution, e.g., time spent so far, number of hops, hints for next stages, etc. (w.r.t. the resolution process). In some embodiments, metadata may be useful as hints for both humans and machines—it can be used by other systems (e.g., resolver), by the client or UI (e.g., context), or by resolvers (e.g., type of address).

With respect to name resolution, a name containing names from multiple systems may, in some embodiments, be resolved via a series of resolution-points, each of which consumes part of the name and looks it up before passing it on to the next stage in the process. (UNIX filename lookup is an example of this form: each step consumes one directory-name.) Metadata may help this process by, for example, hinting how many moniker=value attributes should be resolved by a given resolver before passing the name to the next resolver.

In some such embodiments, the metadata can specify which attributes are to be consumed at each step of the resolution process. In some embodiments, the metadata can also specify the latencies at each step of the resolution process—these are accumulated with the name so that the most efficient resolution paths can be chosen. In further embodiments, if the metadata specifies that it expects an MX record from a resolver, the resolver's returned value can be type-checked against this. This ability for the resolver's client to assert the expected address type may improve resolution correctness.

In some embodiments, a context-sensitive name may hold context(s) in its metadata (potentially multiple contexts). Scheduling information such as machines can be useful as hints (either for humans or machines) to try to communicate with the task—if the task has been moved, the attempt merely fails and that piece of metadata can be nullified.

In some embodiments, there may be questions about the correctness or validity of metadata (e.g., ACL revoked, resolver moved, etc.). In some such embodiments, one approach to address this issue is to treat metadata as cached information, rather than authoritative information. In some embodiments, such cached information may expire after a specified time period, such as a timeout period.

Name Schemas and Add-Ons

In some embodiments of a naming scheme as discussed herein, the idea of using a machine-readable schema to describe the content and format of names (e.g. a list of attributes) may be extended as follows:

a. providing per-attribute validation functions in the schema—e.g., to check that the values of the attributes are correct or acceptable (e.g., as to type, length (min and max), content (e.g., range between 0 and 100), etc.). For example, a username attribute might be constrained to have values that are at least 6 chars long, and contain only letters and digits.

b. providing multi-attribute validation functions in the schema: checks that look at the values of multiple attributes at once (e.g., if an attribute A's value is a numeric string, then attribute B's value is an alphabetic string).

In some embodiments, such validation functions, or variants or combinations thereof, can be invoked when a name is provided, being built up, or on demand, to check for validity. Referring back to FIG. 1, in one embodiment, the valid moniker determination 1090 may be expanded to include a check of the attribute value itself.

Origin Attributes

Some embodiments of a name validation and/or derivation scheme as discussed herein may include the idea of a special untyped name attribute which can be used in name schema. In some embodiments, such an attribute may be called "origin" or "_origin". In some embodiments of a name schema, an untyped name attribute such as "origin" may take, as its value, a fully-qualified resource name matching any schema. In some embodiments, the "origin" attribute may be compatible with recursive use, i.e., it may contain an arbitrary number of nested origins within itself (and/or within other resource names). In some embodiments, such recursive use (i.e., nesting) may preserve an original supplied resource name(s) recursively. In some embodiments, the original supplied resource name(s) may come from an internal component or from a human user or administrator. Particularly, in the case if human-specified names, such recursive use will continue to preserve the original human-specified name.

In some embodiments, such recursive nesting provides a technique for carrying through human-specified names by expressly encoding the original human-specified name as an attribute in the name used by the system. In some embodiments, all UI and reporting (e.g., error logs) can quote the original name, and UI queries can use the original name using such an "origin" attribute. In some embodiments, all internal names include an "origin" attribute. In some embodiments, all derived names may be configured to pass an "origin" attribute. It is also possible, in some embodiments, to associate an "origin" attribute with metadata that explains how it is to be represented (e.g., a mini-schema that indicates how to parse it, or how to display it—e.g., by eliding parts that aren't necessary).

In some embodiments, there may several syntax options for representing "origin"-related derivations. One syntax embodiment may include nesting. In some nesting embodiments, the syntax may entail adding an "origin" attribute whose value is the originating name [_schema=derived attr1= . . . _origin=[_schema=original attr2= . . . ]] Another syntax embodiment may include sequencing. In some sequencing embodiments, the syntax may entail writing the original name to the right of the new parts, with a "join" operator, such as "+" or "|" (this is sometimes called the "sausage form:): [_schema=derived attr1= . . . ]+ [_schema=original attr2= . . . ] Such an embodiment of origin attribute nesting is shown in FIG. 4.

In FIG. 4, an object may be given a human-typed or human-generated name 4110. This object may then be included as an object in a first schema 4000 or name space. This schema may associate certain monikers or attributes with the object. For example, an object in the schema 4000 may have a first moniker 4010 and a second moniker 4010. The object 4000 may also include an origin attribute 4030 that preserves the human-generated object name.

The resource identified by the first schema object 4000 may be referred to in a second schema (Schema 1-1) as an object of that schema 4040. The 1-1 schema may, in some embodiments, be a child of the first schema. In such an embodiment, the 1-1 schema object 4040 may inherit the first moniker 4060 and the second moniker 4070 from the previous schema as well as an origin attribute 4100. In other embodiments, such inheritance may not occur because either the attributes are overloaded or because one schema is not the child of another. In such embodiments, the 1-1 schema may have a separate or overloaded origin attribute 4090 instead of the inherited one 4100. The 1-1 schema may also define its own object attributes, such as S11_Moniker_3 4050 and S11_Moniker_4 4080. In embodiments where the 1-1 schema is not a child of the first schema or where the origin attribute 4090 of the 1-1 schema is overloaded, origin attribute 4090 of the 1-1 schema object may, in some embodiments, refer back to the origin attribute 4030 of the Schema 1 object 4000. In other embodiments, the 1-1 schema object 4040 may also refer to the human-generated object name 4110 in the origin attribute. In embodiments where the 1-1 schema object 4040 refers to the Schema 1 object 4000 in its origin attribute, the value of the origin attribute 4030 from the Schema 1 object 4000 may be said to be nested within the value of the 1-1 schema object 4040 origin attribute 4090.

Rules that Describe Name Derivations

Some embodiments of name schemas and name derivation techniques may also pertain to techniques that allow a destination resource name matching a given schema to be derived from one or more source names and additional information (e.g., attribute values). Such techniques may be expressed in the form of derivation rules or transformation rules. Embodiments of such rules may include some or all of:

a. Changing a value of a schema attribute (e.g., from X to XStatus), but keeping the rest of the attributes unchanged.

b. Changing one or more other attribute values (e.g., if cell=IA, then a backup might always be in cell=IB).

c. Adding attributes (e.g., task name schema=job name schema+task attribute).

d. Deleting attributes (e.g., job name schema=task name schema−task attribute).

e. Nesting names: a resource name according to the naming schema described herein can contain ("nest") other resource names as values of attributes (based on the schema).
  i. In some embodiments, the nested names can be either typed (to match a given schema) or untyped (can match any schema).
  ii. In some embodiments, such nested names may be used to record the name of a "parent object" and/or "source object(s)" of the named object.
  iii. In some embodiments, user-specified job request objects such as allocs and tasks may have bound instantiations on machines. A BoundX schema name may contain a nested X schema name.
  iv. In some embodiments, a nested _origin attribute whose value is the user-provided job name may be added to derive the name of the job in the system f. Extracting an attribute from a nested name (e.g., extract the X name from the BoundX name, extracting the nested user-specified job name from the system job name).

g. Picking and choosing just some parts of one or more source name, possibly with additional attributes, to derive a destination name. For example, while re-scheduling a job from one cell to another, taking user and job attributes from the name of a job instance, along with the name of the new cell, in order to derive a new name for the job's next instance.

h. More general transformations that affect multiple attributes, or combine the values of several attributes to make a new one (e.g., in translating a task name into a name containing a single DNS string, combining the cell, user, job and task attributes from the former into one string for the latter).

Some embodiments may also relate to the idea of describing these transformations as additional information in a schema, either in a special language that expresses the rules, or as embedded (interpretable) code. Other embodiments may relate to the idea of describing these transformations as free-standing code (e.g., C++ code in a system, perhaps associated with the implementation of the objects that are being named). In some such embodiments, the schema specifications can be used to automatically generate code for name derivations given the schema specifications, i.e., the source schema(s) and the destination schema.

For example, the exemplary instruction sequence shown below translates a Task name (schema containing job, task, incarnation attributes) into the corresponding TaskStatus name (schema with the same attributes, differing only in aspace):
  a. def GenTaskStatusName(task_name):
    i. task_status_name=task_status_name.TaskStatusName
    ii. task_status_name.aspace="TaskStatus"
    iii. task_status_name.job=task_name.job
    iv. task_status_name.task=task_name.task
    v. task_status_name.incarnation=task_name.incarnation
    vi. return task_status_name
  Such a name derivation may allow software that knows the name of a Task to automatically "deduce" the name of its corresponding TaskStatus object. Moreover, in embodiments where all ONames are unique, having the names of the TaskStatus objects, may enable one to retrieve the associated tasks using appropriate resolvers.

Object Groups

Some embodiments of name derivation as described herein can be used to provide name-groups, with some useful property, such as, for example, "all these objects should be deleted at the same time, or not at all." Such an embodiment may be useful in situations where a particular resource name is a member of multiple groups, for instance.

In some embodiments, the rules used to determine whether names are part of a group can be specified in a schema: e.g., "all names that have the same values of these attributes can be considered a group", or "all names that have attribute foo=X should be considered a group"; in some embodiments, arbitrary additional expressions for group membership can be used. Some such schema embodiments may also provide a way of using the name itself to specify membership in multiple groups. For example, a BoundX Name can be in the same group as the BoundXAutomaton Name as well as the UnknownBoundXAutomaton Name. All these three schemas contain the same attributes and are thus any name is derivable from any other in the group.

In some further embodiments, different name types can be gathered into a group by providing additional linkage metadata in schemas, such as explicit lists of related schemas, or a tree-like structure to relate schemas (a schema can record a linkage to one or more parents or children, and all the schemas with the same root can be treated as a group). The schema linking tree could align perfectly with the tree of name-derivation rules, or be completely disjoint, or some mixture of the two. The schema-linkage group formation rules can be combined with the name-value group rules. In some further embodiments, different name types can be gathered into a group by providing additional linkage metadata in schemas, such as explicit lists of related schemas and derivation code that convert names of one schema into names of another schema.

Automatic Time-Unique Names

Some name schema and name derivation embodiments may include a technique for making a name time- and/or space-unique. In some embodiments, this may be realized by adding additional information (e.g., additional attributes) to the source schema in order to ensure that a name refers to precisely one object across the domain of interest, or one object across all time. In one embodiment, this may be realized by adding a "nonce", a unique additional value. Embodiments of nonces may include one or more of the following and/or combinations thereof:
  a. universally unique identifiers (UUIDs)—UUIDs may include long strings that are very likely to be unique
  b. generation numbers—short integers that can be used to distinguish instances that may otherwise be the same
  c. timestamps, or short-form timestamps—such as the creation time of a name, or, in embodiments where there can be no more than one name per day, the day on which a name was created In some embodiments, the form and type of nonce that gets added can be specified in the schema. If the source name is already unique, there may be no need to add additional information. In some embodiments, a "nonce" attribute that ensures uniqueness may be an attribute as any other. In some embodiments, it may look like nonce=047d7beb-91269947-21a90000-516d9a1c. In some embodiments, if the origin already has a nonce, it may be suitable to use that nonce to ensure uniqueness, therefore avoiding having to introduce another nonce.

Some name schema and name derivation embodiments may include a technique by which a special instance of a set of objects can be named. Such a special instance of a set may include, for example, the latest in a set of objects, or the first non-completed one (for objects that represent requests). Some embodiments of such a technique may enable use of a space-unique name (sometimes referred to as a fixed name) for some objects (e.g., a job), which the system may then resolve to the latest version of the object (e.g., latest active instance of the job)—this may allow for reuse of the same job name for multiple instances of that job.

In some embodiments, such naming of special instances may be accomplished by means of a "locator" object, which contains the name of the target object. In some embodiments, the locator may act as a symbolic link to the time-unique name that it maps to. In some such embodiments, the locator may be a space-unique name. To derive the locator's name from the time-unique name, an embodiment of name derivation can be used (e.g., by dropping the nonce). In other embodiments, the name of the target object can be dynamically generated (using name derivation) from the name of the locator object and, in some cases, additional state information from outside the naming system (e.g., to find the "largest", or "nearest" target object). In some embodiments, if the target changes, the locator can be updated or replaced.

In some embodiments, because of performance reasons, deleting a system object can be quickly and correctly realized by deleting the locator but not deleting the object itself. Such a deletion technique may also enable garbage-collection of the system object to be performed in the background and/or otherwise asynchronously. Such object deletion embodiments may offer the speed of an asynchronous deletion and the semantics of a synchronous deletion.

Figure 5:
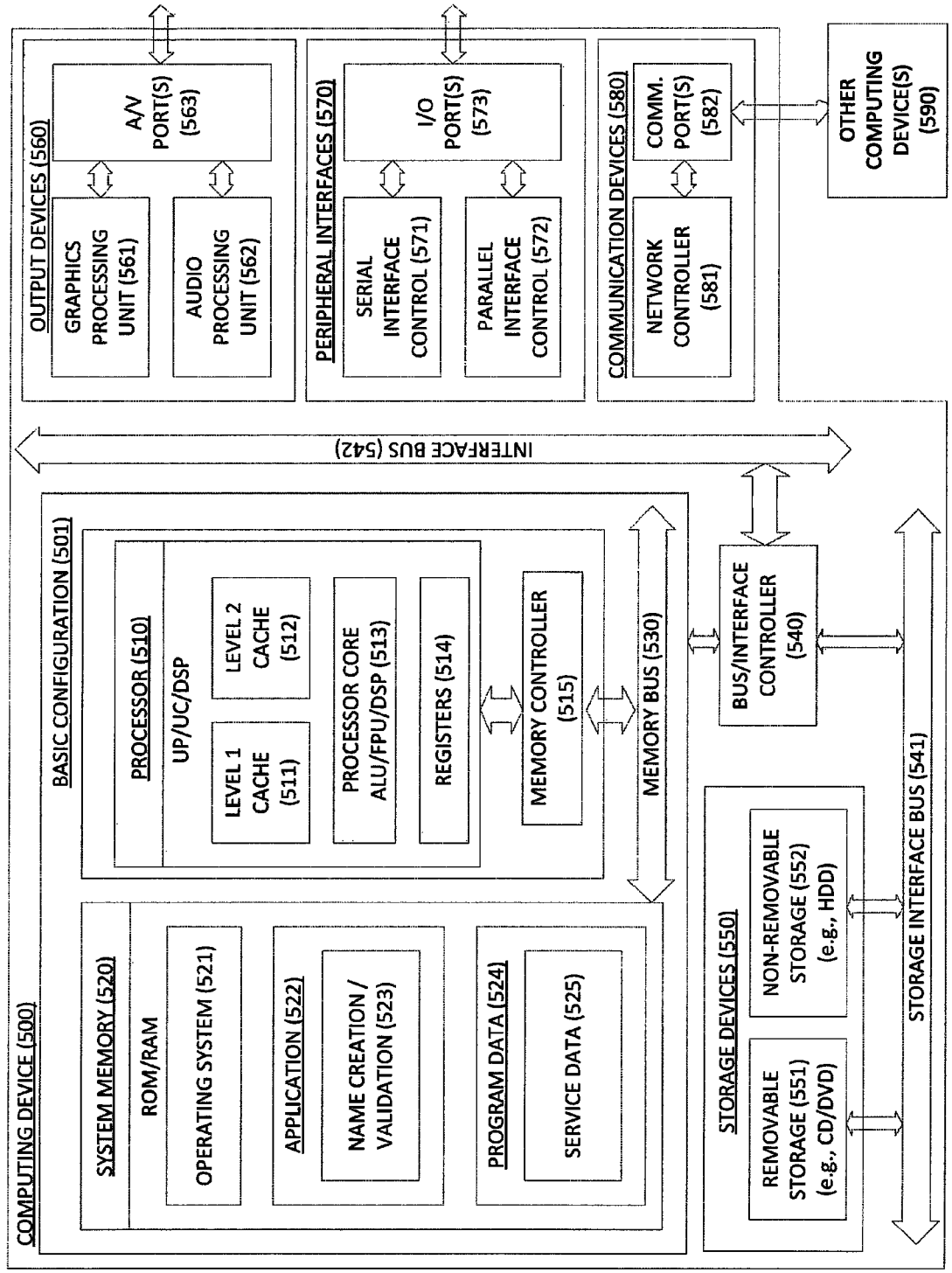
FIG. 5 shows an embodiment of a computing system configured to operate part or all of a name validation, generation, recovery, and/or schema management process as described herein.

FIG. 5 is a block diagram illustrating an example computing device 500 that is arranged to perform name generation and name derivation techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a name management, name generation, name derivation, and/or name schema enforcement feature as discussed herein. Program Data 524 includes location data such as one or more name schemas or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A method of determining whether a resource name is valid within an environment including at least two different resource name spaces, each resource name space having a start and an end, the method comprising:
receiving, as input, the resource name comprising at least three tokens;
determining, by one or more processors and for each token, at least one of a first determination, a second determination, or a third determination, wherein:
the first determination comprises determining whether the token is associated with the start of a resource name space,
the second determination comprises determining whether the token is associated with the end of a resource name space, and
the third determination comprises determining whether the token is associated with an attribute of the received resource name and, if so, whether the attribute is associated with a valid moniker for a resource name space;
when the token is determined to be associated with the start of a resource name space, adding, by the one or more processors, information representing such resource name space onto the top of a stack;
when the token is determined to be associated with the end of a resource name space, removing, by the one or more processors, information representing a resource name space from the top of the stack;
when the token is determined to be associated with an attribute of the received resource name that is not a valid moniker for a resource name space associated with the information at the top of the stack, returning a value indicating an error; and
after the first determination, the second determination and the third determination have each been performed at least once, and provided the value indicating an error was not returned, returning a value indicating that the received resource name is valid.

2. The method of claim 1, wherein the received resource name includes information about a first resource name space and a second resource name space.

3. The method of claim 2, wherein the information about the second resource name space is nested within the information about the first resource name space.

4. The method of claim 3, wherein the second resource name space is represented as part of a value associated with a moniker of the received resource name defined within the first resource name space.

5. The method of claim 2, wherein the first resource name space and the second resource name space have independent naming conventions.

6. The method of claim 1, wherein returning the value indicating an error comprises terminating a name validation process.

7. A system for determining whether a resource name is valid within an environment including at least two different resource name spaces, each resource name space having a start and an end, the system comprising
one or more processors,
memory storing instructions, the instructions being executable by the one or more processors,
wherein the instructions comprise:
receiving, as input, the resource name comprising at least three tokens;

determining for each token at least one of a first determination, a second determination, or a third determination, wherein:
  the first determination comprises determining whether the token is associated with the start of a resource name space,
  the second determination comprises determining whether the token is associated with the end of a resource name space, and
  the third determination comprises determining whether the token is associated with an attribute of the received resource name and, if so, whether the attribute is associated with a valid moniker for a resource name space;
when the token is determined to be associated with the start of a resource name space, adding information representing such resource name space onto the top of a stack;
when the token is determined to be associated with the end of a resource name space, removing information representing a resource name space from the top of the stack;
when the token is determined to be associated with an attribute of the received resource name that is not a valid moniker for a resource name space associated with the information at the top of the stack, returning a value indicating an error; and
after the first determination, the second determination and the third determination have each been performed at least once, and provided the value indicating an error was not returned, returning a value indicating that the received resource name is valid.

8. The system of claim 7, wherein the received resource name includes information about a first resource name space and a second resource name space.

9. The system of claim 8, wherein the information about the second resource name space is nested within the information about the first resource name space.

10. The system of claim 9, where the second resource name space is represented as part of a value associated with a moniker of the received resource name defined within the first resource name space.

11. The system of claim 8, wherein the first resource name space and the second resource name space have independent naming conventions.

12. The system of claim 7, wherein returning the value indicating an error comprises terminating a name validation process.

13. A non-transitory computer-readable medium having embodied thereon instructions which, when executed by one or more processors, cause the one or more processors to perform a method of determining whether a resource name is valid within an environment including at least two different resource name spaces, each resource name space having a start and an end, comprising:
  receiving, as input, the resource name comprising at least three tokens;
  determining for each token at least one of a first determination, a second determination, or a third determination, wherein:
    the first determination comprises determining whether the token is associated with the start of a resource name space,
    the second determination comprises determining whether the token is associated with the end of a resource name space, and
    the third determination comprises determining whether the token is associated with an attribute of the received resource name and, if so, whether the attribute is associated with a valid moniker for a resource name space;
  when the token is determined to be associated with the start of a resource name space, adding information representing such resource name space onto the top of a stack;
  when the token is determined to be associated with the end of the received resource name space, removing information representing a resource name space from the top of the stack;
  when the token is determined to be associated with an attribute of a resource name that is not a valid moniker for a resource name space associated with the information at the top of the stack, returning a value indicating an error; and
  after the first determination, the second determination and the third determination have each been performed at least once, and provided the value indicating an error was not returned, returning a value indicating that the received resource name is valid.

14. The system of claim 13, wherein the received resource name includes information about a first resource name space and a second resource name space.

15. The system of claim 14, wherein the information about the second resource name space is nested within the information about the first resource name space.

16. The system of claim 15, where the second resource name space is represented as part of a value associated with a moniker of the received resource name defined within the first resource name space.

17. The system of claim 14, wherein the first resource name space and the second resource name space have independent naming conventions.

18. The system of claim 13, wherein returning an error comprises terminating a name validation process.

* * * * *